Oct. 27, 1925.
W. H. GRUENHAGEN
1,558,476
COMBINATION HOOK FOR LIVE BAIT
Filed April 21, 1923
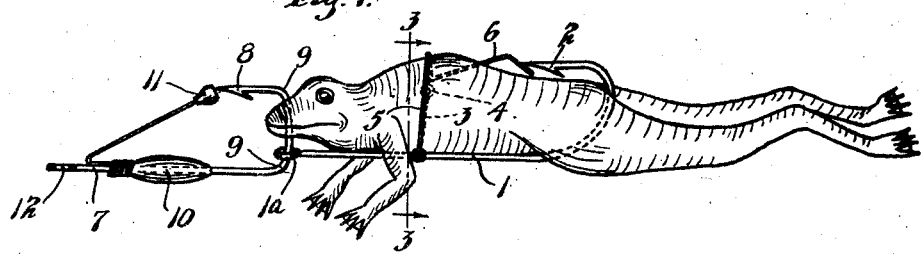
INVENTOR.
W. H. GRUENHAGEN.
BY HIS ATTORNEY Patented Oct. 27, 1925.

1,558,476

UNITED STATES PATENT OFFICE.

WILLIAM H. GRUENHAGEN, OF ST. PAUL, MINNESOTA.

COMBINATION HOOK FOR LIVE BAIT.

Application filed April 21, 1923. Serial No. 633,703.

*To all whom it may concern:*

Be it known that I, WILLIAM H. GRUEN-HAGEN, a citizen of the United States, residing at St. Paul, in the county of Ramsey and State of Minnesota, have invented certain new and useful Improvements in Combination Hooks for Live Bait; and I do hereby declare the following to be a full, clear, and exact description of the invention, such as will enable others skilled in the art to which it appertains to make and use the same.

This invention relates to a fishing device and particularly to a hook or combination of hooks adapted to hold a bait in the form of a frog, minnow or other live form. When fishing with frogs or minnows it is a common practice to hook the same through the nose and in order to hold the bait properly positioned many fishermen, in addition, also hook the frog through the leg, or the minnow through the tail or the rear portion of the body. This results in quickly killing the bait and also mutilates the same.

It is an object of this invention, therefore, to provide a hook having means to hold and support the bait otherwise than merely by a hook passing through the nose thereof without piercing the body of the bait.

It is a further object of the invention to provide a hook having holding means for the bait thereon, which holding means also constitutes a weed guard for the hook.

It is a further object of the invention to provide a combination of two hooks, one of which has holding means thereon for the bait and the other of which is adapted to pass through the nose of the bait, said latter hook having substantially right angle bends at its hooked portion.

These and other objects and advantages of the invention will be fully set forth in the following description made in connection with the accompanying drawings in which like reference characters refer to the same parts throughout the different views, and in which, Fig. 1 is a view in side elevation of the device showing a frog in position thereon;

Fig. 2 is a plan view of a portion of the device; and

Fig. 3 is a vertical section taken on the line 3—3 of Fig. 1, as indicated by the arrows.

Referring to the drawings, the device comprises a hook 1 having the usual curved portion with the barb 2 at the end thereof. The curved portion of the hook is given a lateral inclination so as to extend at an angle to the line of the shank of the hook, as clearly shown in Fig. 2. The hook 1 is provided with a holding means comprising a loop extending transversely of the shank and in a plane substantially at right angles thereto and said loop comprises a side portion 3 secured at one end to the shank and extending upwardly therefrom substantially in the arc of a circle and being formed at its terminal end with a loop 4. The other side 5 of the first mentioned loop extends upwardly from the shank from the same point as the side 3 and also is formed substantially in the arc of a circle. The side 5 extends somewhat more than a half circle to a point closely adjacent the loop or eyelet 4 and is then bent at substantially a right angle and extends toward the barb 2 of the hook, this portion being indicated as 6. It will be seen from Fig. 1 that the portion 6 extends upwardly to a point in front of the end of barb 2 and is then bent downwardly and alongside of the end of the barb so that its end is disposed in the angle between the top of the loop of the hook and the shank thereof, as clearly shown in Fig. 2.

The hook 1 has the usual eyelet 1ª at the terminal end of its shank and this eyelet is carried on the hooked end part of another hook 7. The hook 7 has a barb 8 and the hooked portion thereof is formed with substantially right angular bends 9. The hook 7 is also provided with a weighted portion 10 and a weed guard 11 as well as the usual attaching terminal eyelet 12.

As shown in Fig. 1, when a frog is placed on the hook the same will preferably be hooked through the nose and disposed on the hooked portion of the hook 7. The loop comprising the sides 3 and 5 will then be sprung open and the body of the frog inserted therein. The sides 3 and 5 are made of a comparatively small spring wire so that the body of the frog will be snugly embraced by the loop. There will, of course, be some range of adjustment of the sides 3 and 5 by pressing the same together or springing the same somewhat apart. The curved end portion of the hook 1 will pass through the crotch of the frog, as shown in Fig. 1. It will be noted that with the frog so positioned, the same is free to use all four legs and can have comparative free motion in the water. The frog, however, will be held in proper position on the hook as the rear legs thereof cannot pass over the barb 2 on account of the portion 6. The frog is thus so disposed on the hook that any attack on the frog by a fish should result in the fish being hooked. It will also be noted that the nose of the frog is disposed between the eyelet 1ª and the side of the hook 7 which carries the barb 8. The eyelet 1ª is thus disposed closely adjacent the shank of the hook 7 and, owing to the right angle bend 9, in practice, the hook 1 and its eyelet 1ª tend to swing into said bend when the hook or bait is trolled. This position of the eyelet 1ª at the lower corner of the hook keeps the barb of the hook 7 well disposed so that any attack on the front of the frog will probably result in the fish being hooked on the barb 8. The weight 10, by sinking or carrying the hook 7 downward also tends to keep the eyelet 1ª positioned in the corner 9.

If a minnow is used on the hook, the same preferably will also be hooked through the nose on the hook 7 and the body thereof will be embraced by the sides 3 and 5 and the tail portion of the minnow disposed along side of the curved portion of the hook 1, on the side thereof at which the portion 6 extends. The minnow will thus properly be held in position on the hook and in such a position that any attack by a fish on the rear of the minnow or on the head will result in the fish being hooked on the barb 2 or the barb 8, respectively. With a minnow, the eyelet 1ª will, of course, also be positioned in the lower corner 9. The position of the portion 6 acts efficiently as a weed guard and directs any weeds or grass away from the point of the barb 2. If the bait is too large to be properly embraced by the sides of the loop, a rubber band may be passed through the eyelet 4 and over the bait and looped through the bend in the side 5 so as to securely hold the same in position.

From the above description it is seen that applicant has provided a simple and efficient fishing device. A combination weedless hook is formed having means for securely and properly holding the bait in position. The side 5 with its portion 6 acts both as a bait holding means and as a weed guard. The hook can be inexpensively produced and has been actually manufactured and its practicability fully demonstrated.

It will, of course, be understood, that various changes may be made in the form, details, arrangement and proportions of the parts without departing from the scope of applicant's invention, which, generally stated, consists in a device capable of carrying out the objects above enumerated and such as shown and described and set forth in the appended claims.

What I claim is:

1. A fish hook having a resilient loop intermediate its length disposed in a transverse plane, comprising two portions, one of which is bent and extended to a point adjacent the barb of the hook to form a weed guard.

2. The structure set forth in claim 1, said guard portion being extended upwardly to a point adjacent the end of the barb and then slightly downwardly along the sides of the same.

3. A fish hook having a resilient loop intermediate its length disposed in a transverse plane and comprising one short side with a loop at its upper end, and another side having a curved portion terminating in a bend adjacent said loop and extending from said portion to a point adjacent the barb of the hook to form a weed guard.

4. A combination fish hook comprising one hook having means intermediate its length for embracing the bait and having a terminal eyelet carried on another hook on which the bait is impaled, said last mentioned hook being formed with substantially square bends whereby the eyelet of the first mentioned hook will be positioned adjacent the bend next to the shank of the last mentioned hook whereby the barbed portion of the last mentioned hook will be well exposed.

5. A fish hook having a longitudinally extending shank and having a resilient loop disposed transversely thereof intermediate its length, one portion of said loop extending toward and adjacent the barb or said hook to form a weed guard.

6. A combination fish hook comprising two hooks, a weed guard for each hook, one of said hooks being loosely carried on the other and the weed guard of which also constitutes a bait holding device, the other of said hooks having a weighted shank and a substantially right angular bend at the end of the shank in which the end of the first mentioned hook is disposed.

7. A fish hook having the usual shank and bent portion provided with a barb and having a bait holding device comprising a substantially circular resilient band disposed in a transverse plane at an intermediate portion of said shank, said band comprising a short section secured to said shank and having a terminal eyelet, and a longer section extending in said plane to a point adjacent said eyelet and then bent substantially at a right angle and extending to a point adjacent said barb and then downwardly at one side of said barb.

In testimony whereof I affix my signature.

WILLIAM H. GRUENHAGEN.